(12) United States Patent
Hollaway

(10) Patent No.: US 6,194,847 B1
(45) Date of Patent: Feb. 27, 2001

(54) PHOTOELECTRIC LAMP CONTROL WITH TIMER ADJUSTABLE BY LIGHT BLOCKAGE

(76) Inventor: Jerrell P. Hollaway, 3636 Woodstock Ct., Melbourne, FL (US) 32904

( * ) Notice: Subject to any disclaimer, the term of this patent is extended or adjusted under 35 U.S.C. 154(b) by 0 days.

(21) Appl. No.: 09/294,901

(22) Filed: Apr. 21, 1999

(51) Int. Cl.$^7$ .................................................. H05B 37/02
(52) U.S. Cl. ...................................... 315/360; 315/DIG. 4
(58) Field of Search ............................. 315/360, DIG. 4, 315/307, 291, 246, 225, 159, 151, 156; 250/206, 214 AL, 214 DC

(56) References Cited

U.S. PATENT DOCUMENTS

| | | | |
|---|---|---|---|
| 4,139,801 | * | 2/1979 | Linares ................................. 315/159 |
| 4,198,563 | * | 4/1980 | Elssner ........................... 250/214 AL |
| 4,451,763 | * | 5/1984 | Sodini ................................... 315/159 |
| 4,595,860 | * | 6/1986 | Taylor ................................... 315/360 |
| 4,697,122 | * | 9/1987 | Hoffer ............................. 315/DIG. 4 |
| 4,902,906 | * | 2/1990 | Murphy ................................. 315/360 |
| 5,272,418 | * | 12/1993 | Howe et al. ......................... 315/360 |
| 5,357,170 | * | 10/1994 | Luchaco et al. ..................... 315/159 |
| 5,442,177 | * | 8/1995 | Boulos et al. ....................... 250/342 |
| 5,455,488 | * | 10/1995 | Rhooades et al. .................... 315/156 |
| 5,670,846 | * | 9/1997 | Hollaway ............................. 315/159 |

* cited by examiner

*Primary Examiner*—Don Wong
*Assistant Examiner*—Thuy Vinh Tran

(57) ABSTRACT

A lamp adaptor with a photoelectric circuit that energizes a light bulb at dusk and keeps the bulb energized for a number of hours previously selected by suddenly blocking the light sensing element for a corresponding number of seconds. As an aid in counting the number of seconds that the sensor is blocked, the bulb is briefly energized each second.

15 Claims, 1 Drawing Sheet

PHOTOELECTRIC LAMP CONTROL WITH TIMER ADJUSTABLE BY LIGHT BLOCKAGE

BACKGROUND OF THE INVENTION

This invention relates to photoelectric controls with built-in timers used to energize lamps at a certain level of darkness for a predetermined amount of time.

Lamp adaptors with both a photoelectric control and a timer have been provided by others. Howe et al, U.S. Pat. No. 5,272,418, for example, describes a device that reacts to darkness by energizing a lamp and starting a fixed timer, which will de-energize the lamp when the time expires. typically in six hours. While the timer is counting down the photoelectric devices is disabled to prevent any flickering caused by reflected light.

Others products have been developed that operate similar to Howe's device except that the amount of operating time can be adjusted with some type of mechanical control which is a part of the product. The control is usually a variable resistor.

An object of the present invention is to provide a method of adjusting the operating time of such a product without the use of mechanical devices such as switches or variable resistors.

Another object is to energize and de-energize the lamp instantly, at full power, without disabling the photoelectric control. Light sensing could then continue while the lamp is energized in case the darkness that was reacted to was only temporary, as might occur during a mid-day storm.

SUMMARY OF THE INVENTION

Disclosed herein is a photoelectric light control that can be programmed by the user for any number of operating hours simply by suddenly blocking the ambient light at the photocell lens for some number of seconds. For each second the light is blocked the bulb of the lamp will be energized for one hour. The logic means, typically a microcontroller, constantly monitors the ambient light level reaching the photocell and is able to distinguish between a slowing changing light level and a rapidly changing light level. A slow rate of change might be associated with the daily setting of the sun, while a rapid rate of change would usually be the result of someone blocking the photocell with a finger. When the ambient light is thusly blocked, the microcontroller enters into a programming mode and starts a seconds counter. The number of seconds counted while the light is blocked will be converted into hours by applying a fixed ratio of 360 to 1 and then will be stored in the memory of the microcontroller as the operating timer for the normal mode, which will result in an hour of operating time, at the next observed dusk, for each second counted.

When the light is unblocked and the ambient light level is higher than the predetermined level of light at dusk, the microcontroller will exit the programming mode and start watching for a slowing changing light level that would indicate dusk. At dusk, the bulb of the lamp will be energized for the number of hours programmed earlier and then de-energized until the next dusk.

If the bulb turns off during the night hours, while the ambient light is very low, the microcontroller will not turn the bulb back on. This is because the microcontroller has been coded to not respond to darkness unless at least five minutes of daylight has been observed. Likewise, the programming mode will not be entered, even though the transition from light to dark was quite sudden, because the microprocessor has been coded to enter the programming mode only within a few seconds following power application to the lamp.

DESCRIPTION OF PREFERRED EMBODIMENTS

Figure 1:
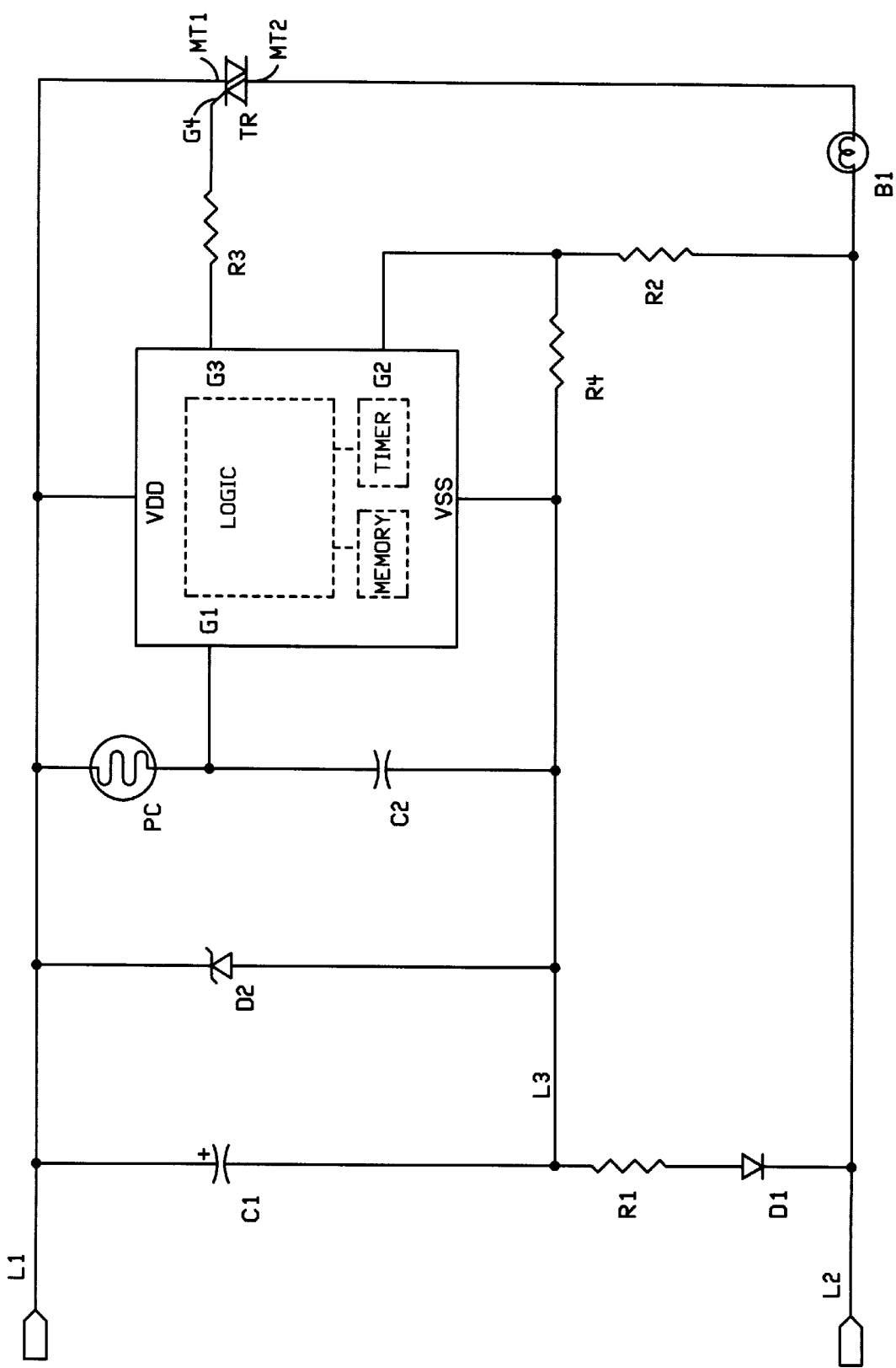
FIG. 1 is a schematic diagram of a preferred embodiment of the present invention.

Referring to FIG. 1, the 120 Volt AC power applied between line L1 and L2 is converted to a lower DC voltage using D1 as a half wave rectifier, resistor R1 as a voltage dropping element, capacitor C1 as a filter, and zenor diode D2 as a voltage regulator, in an arrangement which is well known. The DC voltage, typically 5 volts, is coupled to the appropriate VDD and VSS power connections of microcontroller MC by lines L1 and L3.

Photocell PC and capacitor C2 together form a light sensing means that measures the ambient light reaching the photocell once each AC cycle and furnishes an input signal to MC1. This is accomplished by first holding output gate G1 of MC at the same voltage level as line L3 until time to make a light measurement. At that time, G1 of MC is reconfigured as a high impedance input gate and a light level timer within MC is initialized. C2 will begin to charge through PC while MC watches for G1 to reach a voltage level that is considered to be a logic high. When this level is reached, G1 will be configured again as a low-level output and the value of the light level timer will be recorded. This timer value will be the amount of time (measured in milliseconds) that was required for C1 to charge from a low logic level to a high logic level. Since the time required to charge C1 is directly related to the resistance of PC, and the resistance of PC is inversely related to the amount of light reaching PC, this recorded time is an indication of the ambient light level.

Resistor R2 is coupled between L2 and input gate G2 of MC for the purpose of monitoring the rise and fall of the power line voltage. Resistor R4 is used to assure the absence of voltage during zero crossing of the AC power cycle. Each time the voltage rises on G2 a new loop through the coded instructions in MC is started. For the purpose of time keeping, each such loop constitutes one-sixty of a second.

Main terminals MT1 and MT2 of TRIAC TR are coupled between load B1 (in this case a light bulb) and power line L1. The other side of the load is coupled directly to power line L2. The gate terminal G4 of TR is coupled to output gate G3 of MC through resistor R3 such that a low logic level at G3 will cause TR to conduct and the load to be energized.

In operation, the light level reaching PC is measured once each AC cycle by recording the time required to charge C2 to a high logic level. Whenever the recorded time is greater than a prescribed signal value, indicating a light level corresponding to dusk, the output signal at G3 of MC is changed from a high logic level to a low logic level. This causes TR to become conductive and the bulb to be energized.

At this time a calculation is performed by the coded instruction within MC to determine the most recent rate of change. In other words, the time to charge C2 most recently is compared to the time required to charge C2 one second earlier.

If this rate of change is less than a predetermined amount, the normal mode of operation is assumed and the bulb is energized for the number of hours set in the last programming mode. After the bulb has been energized for one second, the measured light level, which includes all reflected light, is recorded as a new reference light level that would have to be exceeded in order to de-energize the bulb before the set number of hours have elapsed. In some cases, the reference light level might have to be exceeded for some amount of time before the bulb is de-energized.

If the calculated rate of change is instead greater than a predetermined amount, MC directs the flow of coded instruction a first, programming mode. This means that the seconds timer is initialized and the bulb is energized briefly once each second to aid in counting seconds. When the time required to charge C2 decreases to a level less than the aforedescribed reference time recorded one second after the programming began, the flashing of the bulb stops and the number of seconds recorded in the seconds timer is converted to hours of operation in a second, normal mode.

If the number of seconds in the programming mode exceeds a reasonable number of seconds, perhaps 12 to 15 seconds, the programming mode will be aborted and the most recently programmed number of seconds will continue to represent the hours of normal operations.

Also, if programming has not been successfully accomplished since the last time power was applied to the lamp, a default value, such as 6 hours, will be used in normal operation.

Clearly, many variations of the present invention may be accomplished by one skilled in the art of electronics. For example, in this preferred embodiment the value of C1 may be as large as possible to provide a long memory retention if the power is temporarily disconnected. (MC can also be put into a sleep mode while the power is absent.)

MC is discussed herein as a microcontroller but the logic function could easily be accomplished with an Application Specific Intergrated Circuit (ASIC) design. And, of course, a standard analog to digital converter could be used as a part of the light sensing means.

Other improvements and variations may be accomplished by using the teachings of this disclosure without departing from the essence of the present invention.

I claim:

1. A light control apparatus comprising:
   a light sensing means which produces an input signal representative of the amount of light present at said sensing means;
   logic means for comparing said input signal with a prescribed signal value and for comparing the rate of change of said input signal with a prescribed rate of change, for selecting between a programming mode and a normal mode of operation according to said comparisons, and for providing output signals for each of said modes; and
   a power switching means coupled between a source of electrical power and a load which controls the application of said power to said load in response to said output signal from said logic means.

2. A method of controlling the operating time of a lamp control circuit having light sensing means that includes the steps of:
   (1) suddenly blocking ambient light to said sensing means to define the beginning of a first period of time;
   (2) unblocking said ambient light to said sensing means to define the end of said first period of time;
   (3) energizing a light bulb whenever said ambient light slowly decreases to a level that is less than a prescribed level;
   (4) maintaining said bulb in an energized state for a second period of time that is related to said first period of time;
   (5) preventing said bulb from being energized again by another slowly decreasing ambient light level until said ambient light level has been greater than a prescribed level for said prescribed amount of time.

3. A light control apparatus comprising:
   a light sensing means which produces a input signal representative of the amount of light present at said sensing means;
   logic means for comparing said input signal with a prescribed signal value and for comparing the rate of change of said input signal with a prescribed rate of change, for selecting between two modes of operation according to said comparisons, and for providing output signals for each of said modes;
   a power switching means coupled between a source of electrical power and a load which controls the application of said power to said load in response to said output signal from said logic means; and
   timer means and memory means wherein a first of said modes establishes an amount of time to be stored in said memory means, and a second of said modes transfers said amount of time in said memory means to said timer means where said timer means causes said application of said power to said load for said amount of time in said timer means.

4. The apparatus according to claim 3, wherein said first mode is selected by said logic means whenever said input signal is less than said prescribed signal value and said rate of change is greater than said prescribed rate of change, and wherein said second mode is selected by said logic means whenever said input signal is less than said prescribed signal value and said rate of change is less than said prescribed rate of change.

5. The apparatus according to claim 4, wherein said second mode is selected by said logic means only after said input signal has been greater than said prescribed signal value for an amount of time greater than a prescribed amount of time since the last occurrence of said second mode.

6. The apparatus according to claim 5, wherein said amount of time stored in said memory means is a ratio of the amount of time spent in said first mode.

7. The apparatus according to claim 6, wherein each second of time spent in said first mode represents one hour of time stored in said memory means.

8. The apparatus according to claim 3, wherein said load is alternately energized and de-energized by said power switching means whenever said second mode is selected by said logic means.

9. The apparatus according to claim 8, wherein said load is energized once each second.

10. The apparatus according to claim 3, wherein said logic means exits said first mode whenever said input signal is greater than said prescribed signal value.

11. The apparatus according to claim 3, wherein said load is de-energized whenever said input signal is greater than said prescribed said signal value.

12. The apparatus according to claim 3, wherein said load is de-energized only when said input signal is greater than said prescribed signal value for an amount of time that is greater than a prescribed amount of time.

13. The apparatus according to claim 3, wherein said logic means does not change said amount of time in said memory means if said first mode exists for more than a prescribed amount of time.

14. The apparatus according to claim 3, wherein said logic means does not enter said first mode unless an amount of time not greater than a prescribed amount of time has passed since said power was last coupled to said apparatus.

15. The apparatus according to claim 14, wherein said amount of time in said memory is a default value.

* * * * *